United States Patent [19]

Fujimoto

[11] Patent Number: 4,788,240

[45] Date of Patent: * Nov. 29, 1988

[54] CURABLE POLYORGANOSILOXANE COMPOSITIONS

[75] Inventor: Tetsuo Fujimoto, Ohta, Japan

[73] Assignee: Toshiba Silicone Co., Ltd., Japan

[ * ] Notice: The portion of the term of this patent subsequent to Oct. 6, 2004 has been disclaimed.

[21] Appl. No.: 868,216

[22] Filed: May 28, 1986

[51] Int. Cl.$^4$ ............................................. C08L 83/04
[52] U.S. Cl. .................................... 524/290; 524/358; 524/588; 524/715; 524/722; 524/861; 524/862; 524/866; 525/100; 525/478; 525/479
[58] Field of Search ............... 524/715, 861, 862, 190, 524/358; 525/100, 479

[56] References Cited

U.S. PATENT DOCUMENTS 4,114,376  11/1983  Siedle ..................................... 525/100
4,559,396  12/1985  Sasaki et al. ......................... 525/479

*Primary Examiner*—Allan M. Lieberman

[57] ABSTRACT

Polyorganosiloxane compositions comprising:
(A) a polyorganosiloxane having two or more of the following unit, in the molecule, represented by the formula:

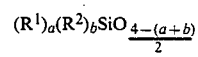

wherein, $R^1$ represents an alkenyl radical; $R^2$ represents a substituted or unsubstituted monovalent hydrocarbon radical having no unsaturated aliphatic bond; a is an integer of 1 of 2; b is an integer of 0 to 2; and a+b is an integer of 1 to 3;

(B) a polyorganohydrogensiloxane, having units represented by the formula:

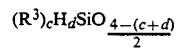

wherein, $R^3$ represents a substituted or unsubstituted monovalent hydrocarbon radical; c is an integer of 0 to 2; d is an integer of 1 or 2; and c+d is an integer of 1 to 3, and having at least three hydrogen atoms bonded to silicon atoms in a molecule, in an amount such that the number of the hydrogen atoms bonded to silicon atoms may be 0.5 to 4.0 per $R^1$ radical contained in polyorganosiloxane (A);

(C) a catalyst selected from the group consisting of platinum and platinum compounds, in an amount of 1 to 100 ppm in terms of platinum atom relative to polyorganosiloxane (A); and (D) anthraquinone dyes and/or azo dyes, wherein the amount is from 1 to 2,000 ppm relative to polyorganosiloxane (A).

4 Claims, No Drawings

CURABLE POLYORGANOSILOXANE COMPOSITIONS

BACKGROUND OF THE INVENTION

The present invention relates to polyorganosiloxane compositions capable of indicating the curing state thereof by change in color.

Addition curable liquid silicone elastomer compositions, which are already well-known, are compositions wherein curing of a polyorganosiloxane having alkenyl radicals and a polyorganohydrogensiloxane having hydrogen atoms bonded to silicon atoms is effected using a catalyst for addition reaction such as a platinum compound etc. (refer to Japanese Patent Publication No. 27853/1968)

Conventionally, in order to check the curing state of an elastomer obtained from such a liquid silicone elastomer composition, evaluation had to be made by observation, for example, through touching the silicone elastomer composition being cured or measuring penetration thereto or rubber hardness.

For example, when such liquid silicon elastomers are used for molding or as a dental impression material, operators or dentists have to touch the silicone elastomer occasionally to judge the curing state upon releasing the rubber mold from a prototype or oral cavity and keep observing the curing state of the elastomer by touching until it is releasable. Such processes have consumed much valuable time of the operators and it has often kept them from their primary diagnostic activities.

It has also happened that releasing of elastomer or the next process is conducted while the curing state of the elastomer is insufficient because the point where curing is completed may not properly be evaluated by touching, which brings about such troubles as breakage of the elastomer, sticking of the elastomer to the prototype etc.

SUMMARY OF THE INVENTION

The present invention is intended to provide a polyorganosiloxane composition which can instantly indicate the curing state thereof by change in color without requiring any cumbersome operations in order to observe the curing state of the elastomer, for example, by touching or measuring penetration and hardness of the elastomer.

As a result of extensive studies to improve upon prior art disadvantages, the inventor has found that a polyorganosiloxane composition can be obtained by adding anthraquinone dyes and/or azo dyes to a silicone elastomer composition which is cured by reaction of hydrosilyl radicals with alkenyl radicals bonded to silicon atoms, and by the change in color or fading out of color as the curing thereof goes on, one can visually know the curing state.

DESCRIPTION OF THE INVENTION

The polyorganosiloxane composition of the present invention comprises (A) a polyorganosiloxane having two or more of the following unit, in the molecule, represented by the formula:

wherein, $R^1$ represents an alkenyl radical; $R^2$ represents a substituted or unsubstituted monovalent hydrocarbon radical having no unsaturated aliphatic bond; a is an integer of 1 or 2; b is an integer of 0 to 2; and a+b is an integer of 1 to 3;

(b) a polyorganohydrogensiloxane, having units represented by the formula:

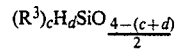

wherein, $R^3$ represents a substituted or unsubstituted monovalent hydrocarbon radical; c is an integer of 0 to 2; d is an integer of 1 or 2; and c+d is an integer of 1 to 3, and having at least three hydrogen atoms bonded to silicon atoms in a molecule, in an amount such that the number of the hydrogen atoms bonded to silicon atoms may be 0.5 to 4.0 per $R^1$ radical contained in polyorganosiloxane (A);

(C) a catalyst selected from the group consisting of platinum and platinum compounds, in an amount of 1 to 100 ppm in terms of platinum atom relative to polyorganosiloxane (A); and (D) anthraquinone dyes and/or azo dyes, wherein the amount is from 1 to 2,000 ppm relative to polyorganosiloxane (A).

The present invention will further be illustrated below in detail.

Polyorganosiloxane (A) to be used in the present invention comprises at least two alkenyl radicals bonded to silicon atoms in the molecule. As such a polyorganosiloxane (A), there may be used any of linear molecules and branched ones or mixture thereof.

$R^1$ in the above formula is exemplified by vinyl radical, allyl radical, 1-butenyl radical, 1-hexenyl radical or the like. However, because of ease of synthesis, vinyl radical is most advantageous. $R^2$ and the organic radicals bonded to silicon atoms of other siloxane units are exemplified by an alkyl radical such as methyl radical, ethyl radical, propyl radical, butyl radical, hexyl radical, dodecyl radical, etc., an aryl radical such as phenyl radical, an aralkyl radical such as $\beta$-phenylethyl radical or $\beta$-phenylpropyl radical, a substituted hydrocarbon radical such as chloromethyl radical, 3,3,3-trifluoropropyl radical etc. Of these radicals, methyl radical is most preferred because of ease of synthesis and because it can impart to a polyorganosiloxane a polymerization degree necessary to maintain its favorable mechanical properties after curing, yet the polyorganosiloxane compound has a low viscosity prior to curing. When the composition of the present invention is used for injection molding, potting, coating, impregnation, etc., it is preferred that the viscosity at 25° C. be in the range from 50 to 200,000 cP, especially from 100 to 100,000 cP so that said composition may have a property suitable in respective cases, especially an appropriate flowability prior to curing and excellent mechanical properties after curing. Those with viscosity of less than 50 cP will bring about difficulties in obtaining sufficient elongation and elasticity after curing; whereas those with viscosity exceeding 200,000 cP will bring about disadvantageous handling in mold injection, potting and other processes.

In order to cure the composition through crosslinking, it is required for the polyorganohydrogensiloxane of component (B) to have at least three hydrogen atoms bonded to silicon atoms in the molecule. $R^3$ in the above formula and the organic radicals bonded to silicon atoms of other siloxane units are exemplified by the same radicals as defined for $R^2$ of component (A). However, because of ease of synthesis, methyl radical is most preferred. As such polyorganohydrogensiloxane (B), there may be used any of linear, branched and cyclic siloxanes or mixtures thereof.

As component (B), the following compounds a to d as shown below are preferred in that they give favorable mechanical properties to cured elastomer.

a. A branched polyorganohydrogensiloxane comprising units of $(CH_3)_2HSiO_{\frac{1}{2}}$ and $SiO_2$, wherein the content of hydrogen atoms bonded to silicon atoms is in the range from 0.3 to 1.2% by weight of the molecular weight thereof.

b. A linear polyorganohydrogensiloxane represented by the formula:

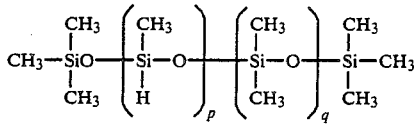

wherein p is an integer of 3 to 100 and q is an integer of 0 to 100, c. A linear polyorganohydrogensiloxane represented by the formula:

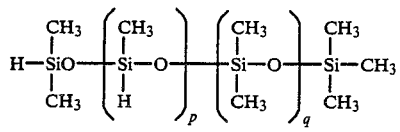

wherein p is an integer of 2 to 100 and q is an integer of 0 to 100 d. A linear polyorganohydrogensiloxane represented by the formula:

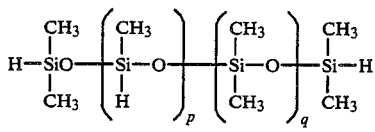

wherein p is an integer of 1 to 100 and q is an integer of 0 to 100, for b, c and d the content of hydrogen atoms bonded to silicon atoms is in the range from 0.5 to 1.6% by weight of the molecular weight respectively.

Component (B) is used in an amount such that the number of hydrogen atom bonded to silicon atoms contained in component (B) may be 0.5 to 4.0, preferably 1.0 to 3.0, per alkenyl radical contained in component (A). In the case where the number of hydrogen atom is less than 0.5, the composition does not cure enough and leave low hardness elastomer. On the other hand if it is 4.0 or more, the cured composition gives poor physical properties.

The platinum catalysts of component (C) are intended to accelerate the addition reaction between the alkenyl radicals in component (A) and the hydrosilyl radicals in component (B), and are exemplified by elemental platinum, chloroplatinic acid, platinum-olefin complexes, platinum-alcohol complexes, platinum coordination compounds etc. Component (C) is used in an amount of 1 to 100 ppm in terms of the amount of platinum atoms relative to component (A). In the case where the amount is less than 1 ppm, the effect of the present invention may not be exhibited, whereas in the case where the amount is 100 ppm or more, cure rate is not improved further.

It is preferred that the anthraquinone dyes and/or the azo dyes of component (D) to be used in the present invention are soluble in the polyorganosiloxane of component (A) or component (B). However, since such dyes can be used dissolved in an organic solvent such as toluene and dispersed in the polyorganosiloxane composition, they may be any such dye which is soluble in an organic solvent. It is also possible to use dyes which are insoluble in component (A) or (B), because the effect of the present invention will not be lost even by dispersing such dyes to the polyorganosiloxane composition through mixing. The anthraquinone dyes are exemplified by KAYASET BLUE 814 (tradename, produced by Nippon Kayaku Co.), ORIENTAL OIL BLUE K (tradename, produced by Toyo Ink Mfg. Co.), ORIENT OIL VIOLET No. 730 (tradename, produced by Orient Chemical industries), SUMIPLAST BLUE CA (tradename, produced by Sumitomo Chemical Industry) etc.

The azo dyes are exemplified by monoazo- or polyazo dyes, metal complex azo dyes, pyrazolone azo dyes, stilbene azo dyes, thiazole azo dyes etc. However, bisazo dyes having two azo (—N=N—) radicals are most preferred in order to exert the effect of the present invention sufficiently. The bisazo dyes are exemplified by ORIENT OIL RED 5B (tradename, produced by Orient Chemical Industries), KAYASET RED 802 (tradename, produced by Nippon Kayaku Co.), OIL RED SA EXTRA (tradename, produced by Hakudo Kagaku Kenkyusho) etc. As component (D), there may be used either anthraquinone dyes or azo dyes individually or a combination of both. Component (D) is used in an amount ranging from 1 to 2,000 ppm relative to component (A). In the case where the amount is less than 1 ppm, the effect of the present invention may not sufficiently be exhibited; whereas in the case where it exceeds 2,000 ppm, change in color is sometimes weak to recognize.

To the composition of the present invention there may optionally be mixed a filler. A solvent may also be mixed thereto, as desired, and other kinds of polyorganosiloxane in such a range where the effect of the present invention may not be impaired, in combination therewith. Such optional additives are usually exemplified by fumed silica, precipitated silica, quartz powder, diatomaceous earth, glass beads, toluene, hexane, polydimethylsiloxane etc. However, use of any additives having their own original color, such as titanium oxide, iron oxide etc., or fillers having big hiding power is not suitable for the object.

The addition curable liquid silicone elastomer may cure at room temperature. However, cure is accelerated by heating it. Thus, in the polyorganosiloxane composition of the present invention, a change in color or fading out of color as the elastomer cures, even in heat curing, can clearly be seen by visual observation.

In ordinary addition cured liquid silicon elastomer, a cured elatomer is obtained by mixing a package comprising a polyorganosiloxane having alkenyl radicals and a platinum catalyst with proper amount of package comprising a polyorganohydrogensiloxane having hydrogen atoms bonded to silicon atoms. In the silicone elastomer compositions of the present invention, the mixing state is observed visually by coloring either one or both of these polysiloxane components with anthraquinone dyes and/or azo dyes. Furthermore, the curing state is recognized by change in color.

EXAMPLES OF THE INVENTION

The present invention will be illustrated below in more detail by referring to the Examples. In the Examples, part(s) means part(s) by weight.

EXAMPLE 1

A blue colored composition S-1 was prepared by mixing the following materials uniformly; 100 parts of dimethylvinylsilyl endblocked polydimethylsiloxane base fluid having a viscosity of 3,000 cP at 25° C., 20 parts of ground quartz powder: CRYSTALITE VX-SS (tradename, produced by Tatsumori Co.), 2 parts of trimethylsilyl endblocked linear polymethylhydrogensiloxane having 0.8% by weight of silicon-bonded hydrogen and a viscosity of 20 cP at 25° C., 30 parts per million of platinum based on the weight of the base fluid as an isopropyl alcohol solution of chloroplatinic acid, and 100 parts per million of KAYASET BLUE 814 based on the weight of the base fluid as a toluene solution of the dye.

Blue color of the composition S-1 disappeared with cure as shown in Table 1, when S-1 was placed in a 25° C. atmosphere. Cure was clearly recognized by change in color.

EXAMPLE 2

Component S-2(a) was prepared by adding 30 ppm from isopropyl alcohol solution of chloroplatinic acid in terms of platinum to 100 parts of polydimethylsiloxane endblocked by dimethylvinylsilyl radicals and having a viscosity of 350 cP at 25° C., with stirring.

Composition S-2(b) colored red was prepared by mixing 5 parts of polymethylhydrogensiloxane comprising units of $(CH_3)_2HSiO_{\frac{1}{2}}$ and $SiO_2$, containing 1.20% by weight of hydrogen atoms bonded to silicon atoms and having a viscosity of 20 cP at 250° C., 95 parts of polydimethylsiloxane endblocked by trimethylsilyl radical and having a viscosity of 50 cP at 25° C. and 100 ppm of a toluene solution of KAYASET RED 802 (tradename, produced by Nippon Kayaku K.K.) (in terms of KAYASET RED 802 relative to the base oil) with stirring.

To 100 parts of S-2(a) were added 100 parts of S-2(b), and upon stirring of the resulting mixture, it turned red homogeneously. Thus, it was visually judged clearly whether the stirring was adequate or not. When the thus obtained mixture was left to stand in an atmosphere of 25° C. or 80° C. to effect curing, the color turned from red to yellow as the elastomer cured as shown in Table 2 and the degree of curing was clearly evaluated by the change in color.

EXAMPLE 3

Component S-3(a) colored blue was prepared by mixing 100 parts of polydimethylsiloxane base fluid endblocked by dimethylvinylsilyl radical and having a viscosity of 5,000 cP at 25° C., 10 parts of fumed silica: AEROSIL 200 (tradename, produced by Degussa Japan Co., Ltd.), 20 ppm of chloroplatinic acid (in terms of platinum relative to the base fluid) and 300 ppm of ORIENTAL OIL BLUE K (tradename, produced by Toyo Ink Mfg. Co.)

Component S-3(b) colored red was prepared by adding 0.2 part of OIL RED SA EXTRA (tradename, produced by Hakudo Kagaku Kenkyusho) to 100 parts of straight chain polymethylhydrogensiloxane endblocked by trimethylsilyl radicals, containing 0.88% by weight of hydrogen atoms bonded to silicon atoms and having a viscosity of 50 cP at 25° C.

To 100 parts of S-3(a) was added 1.0 part of S-3(b) and the resulting mixture was stirred. The mixture turned purple homogeneously, and it was visually evaluated clearly whether the stirring was adequate or not. When the thus obtained mixture was left to stand in an atmosphere of 25° C., the color turned from purple to green as the elastomer cured, and the degree of curing was clearly evaluated by the change in color. The rubber hardness (JIS A) at the time when the color turned from purple to green was 25, and the same hardness was maintained thereafter.

TABLE 1

| Time after mixing (minutes) | 3 | 10 | 15 | 30 |
|---|---|---|---|---|
| Hardness (JIS A) | 0 | 20 | 27 | 27 |
| Observation by finger touch | tacky | non-tacky | non-tacky | non-tacky |
| Color change | blue | pale blue | blue disappeared | blue disappeared |
| Remarks | gel-like | cured | completely cured | completely cured |

TABLE 2

| (at 25° C.) | | | | |
|---|---|---|---|---|
| Time after stirring (minutes) | 15 | 40 | 60 | 120 |
| Cone penetration ASTM D-1403 | 100 | 50 | 12 | 12 |
| Observation by finger touch | very tacky | slightly tacky | non-tacky | non-tacky |
| Color change | red | orange | yellow | yellow |
| Remarks | gel-like | mostly cured | completely cured | completely cured |
| (at 80° C.) | | | | |
| Time after stirring (minutes) | 3 | 7 | 10 | 30 |
| Cone penetration ASTM D-1403 | 80 | 20 | 11 | 11 |
| Observation by finger touch | tacky | slightly tacky | non-tacky | non-tacky |
| Color change | red | orange | yellow | yellow |
| Remarks | gel-like | mostly cured | completely cured | completely cured |

I claim:

1. Polyorganosiloxane compositions comprising:
(A) a polyorganosiloxane (A) having two or more of the following units, in each molecule, represented by the formula:

$$(R^1)_a(R^2)_b SiO_{\frac{4-(a+b)}{2}}$$

wherein, $R^1$ represents an alkenyl radical; $R^2$ represents a substituted or unsubstituted monovalent hydrocarbon radical having no unsaturated aliphatic bond; a is an integer of 1 or 2; b is an integer of 0 to 2; and a+b is an integer of 1 to 3;

(B) a polyorganohydrogensiloxane (B), having units represented by the formula:

$$(R^3)_c H_d SiO_{\frac{4-(c+d)}{2}}$$

wherein, $R^3$ represents a substituted or unsubstituted monovalent hydrocarbon radical; c is an integer of 0 to 2; d is an integer of 1 or 2; and c+d is an integer of 1 to 3, and having at least three hydrogen atoms bonded to silicon atoms in each molecule, in an amount such that the number of the hydrogen atoms bonded to silicon atoms may be 0.5 to 4.0 per $R^1$ radical contained in polyorganosiloxane (A);

(C) a catalyst selected from the group consisting of platinum and platinum compounds, in an amount of 1 to 100 ppm in terms of platinum atom relative to polyorganosiloxane (A); and (D) from 1 to 2,000 ppm of a dye selected from the group consisting of anthraquinone dye and azo dye, relative to polyorganosiloxane (A).

2. The composition according to claim 1 wherein $R^1$ contained in polyorganosiloxane (A) is a vinyl radical.

3. The composition according to claim 1, wherein the polyorganohydrogensiloxane (B) is a compound represented by the formula:

$$R^4(CH_3)_2SiO[(CH_3)HSiO]_p[(CH_3)_2SiO]_q Si(CH_3)_2R^4$$

wherein, $R^4$ represents hydrogen atom or methyl radical; g is an integer of 0 to 100; p is an integer of 1 to 100 when both of $R^4$ are hydrogen atoms; p is an integer of 2 to 100 when one of $R^4$ is hydrogen atom and the other $R^4$ is a methyl radical; p is an integer of 3 to 100 when both of $R^4$ are methyl radicals.

4. The composition according to claim 1, wherein polyorganohydrogensiloxane (B) comprises units of $(CH_3)_2HSiO_{\frac{1}{2}}$ and $SiO_2$, and the content of the hydrogen atoms bonded to silicon atoms is 0.3 to 1.2% by weight of the molecular weight thereof.

* * * * *